US010407067B2

(12) United States Patent
Henel et al.

(10) Patent No.: US 10,407,067 B2
(45) Date of Patent: Sep. 10, 2019

(54) VEHICLE HILL START ASSIST SYSTEM

(71) Applicant: Ford Global Technologies, LLC, Dearborn, MI (US)

(72) Inventors: Christoph Henel, Mettmann (DE); Sebastian Leitermann, Erfstadt (DE); Tadeusz Bularz, Essen (DE); Marc Suermann, Duisburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 15/209,172

(22) Filed: Jul. 13, 2016

(65) Prior Publication Data
US 2017/0015327 A1 Jan. 19, 2017

(30) Foreign Application Priority Data
Jul. 14, 2015 (DE) .................. 10 2015 213 193

(51) Int. Cl.
*B60W 30/18* (2012.01)
*B60T 7/12* (2006.01)
*B60W 10/04* (2006.01)
*B60W 10/18* (2012.01)

(52) U.S. Cl.
CPC ....... *B60W 30/18118* (2013.01); *B60T 7/122* (2013.01); *B60W 10/04* (2013.01); *B60W 10/18* (2013.01); *B60W 30/18027* (2013.01); *B60T 2201/06* (2013.01); *B60W 2420/52* (2013.01); *B60W 2420/54* (2013.01); *B60W 2520/403* (2013.01); *B60W 2550/142* (2013.01); *B60W 2550/143* (2013.01); *B60W 2710/18* (2013.01); *B60W 2720/10* (2013.01)

(58) Field of Classification Search
CPC .......... B60W 30/18118; B60W 10/18; B60W 10/04; B60W 30/18027; B60W 2520/403; B60W 2420/54; B60W 2420/52; B60W 2710/18; B60W 2720/10; B60W 2550/143; B60W 2550/142; B60T 7/122; B60T 2201/06
USPC ......................................... 701/70
See application file for complete search history.

(56) References Cited

U.S. PATENT DOCUMENTS

| | | | | |
|---|---|---|---|---|
| 5,787,370 A | * | 7/1998 | Kutscher | B60G 17/0195 307/10.8 |
| 2010/0168974 A1 | * | 7/2010 | Bradley, IV | B60T 7/122 701/70 |
| 2011/0276209 A1 | * | 11/2011 | Suganuma | B60W 10/06 701/22 |

(Continued)

FOREIGN PATENT DOCUMENTS

| | | |
|---|---|---|
| DE | 10200783 A1 | 7/2003 |
| DE | 102004047478 A1 | 4/2006 |
| WO | WO2005120915 A1 | 12/2005 |

*Primary Examiner* — Muhammad Shafi
(74) *Attorney, Agent, or Firm* — Raymond L. Coppiellie; Burgess Law Office, PLLC

(57) ABSTRACT

A hill start assist system for a motor vehicle including a control system using sensor data from at least one sensor to provide the hill start assist with improved response behavior. The control system activating the hill start assist automatically and independently of whether the motor vehicle is on an upward incline depending on sensor data from the sensor indicating a local upward gradient in a driving surface in a region of a vehicle axle.

7 Claims, 3 Drawing Sheets

(56) References Cited

U.S. PATENT DOCUMENTS

2013/0211697 A1* 8/2013 Grisi .................. B60T 7/122
  701/112
2015/0217740 A1* 8/2015 Hecker ............... B60T 7/122
  303/123
2015/0234508 A1* 8/2015 Cho .................. G06F 3/0412
  345/173

* cited by examiner

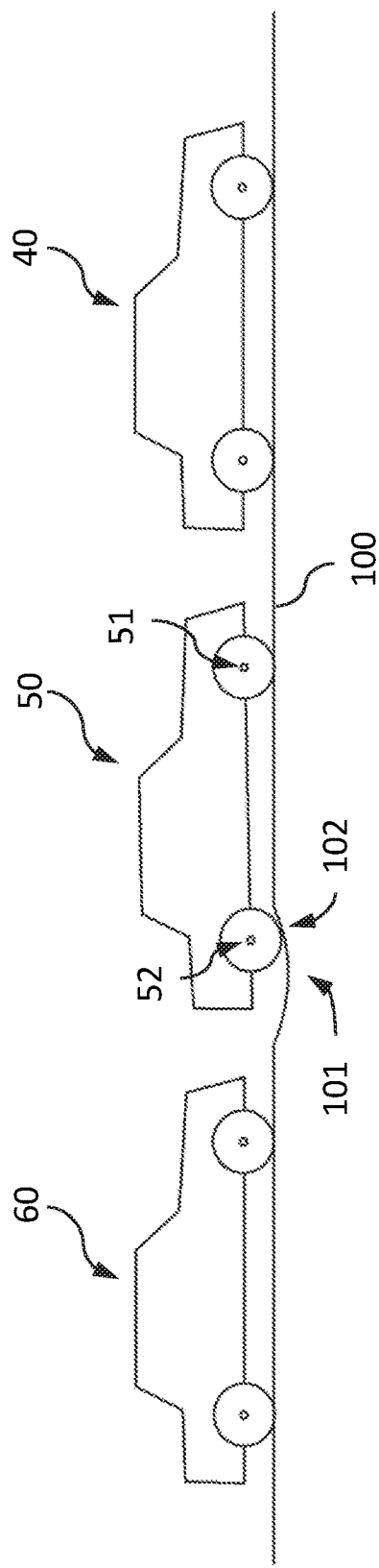
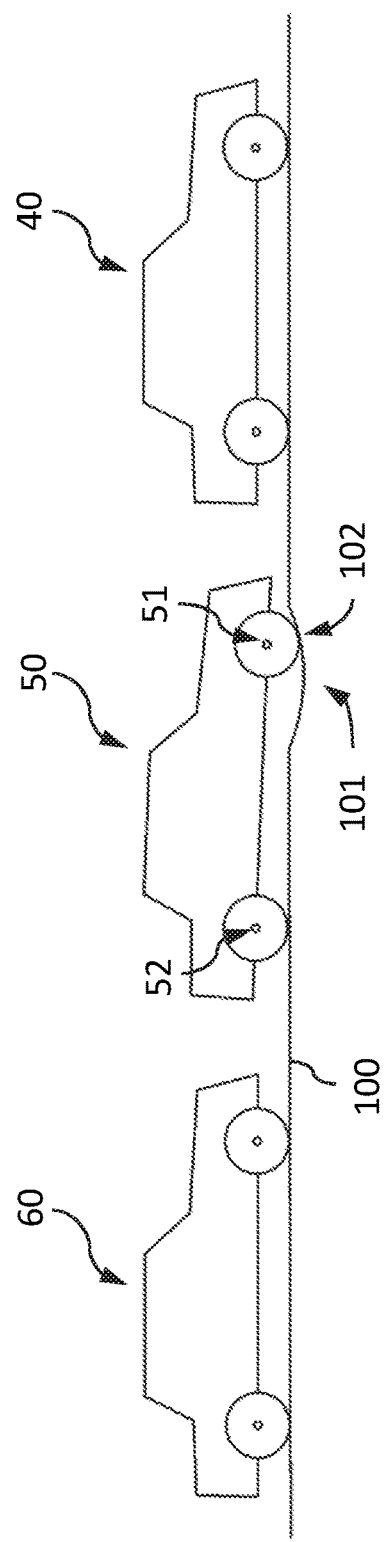

_US 10,407,067 B2_

VEHICLE HILL START ASSIST SYSTEM

CROSS-REFERENCE TO RELATED APPLICATIONS

Not Applicable.

BACKGROUND OF THE INVENTION

1. Field of the Invention

The invention relates to a vehicle assist system; and more specifically, to a system providing a hill start assist with an enhanced response behavior.

2. Description of Related Art

Starting on an upward gradient presents something of a challenge to the driver with conventional motor vehicles, in particular in motor vehicles with a manual transmission. When starting, the driver must coordinate releasing the brake with engaging the clutch and pressing the accelerator so the vehicle ideally moves from the braked state directly to the driven state without the vehicle rolling back. But in reality, even a highly skilled driver cannot always prevent rolling back with a steep upward gradient. In order to counter these problems, a hill start aid/assist was developed whereby on an upward gradient, even after the brake pedal is released, the vehicle brake releases only when the engine provides enough torque to prevent the vehicle from rolling back. The presence of an upward gradient is normally established with an inclination sensor, the hill start aid/assist being automatically activated at a certain threshold value (for example a 1% to 3% upward gradient).

While in principle these systems operate reliably and have proven effective, problems can arise when the vehicle comes to a stop, for example, in a depression, with the front wheels on the rising edge of the depression while the rear wheels are on a flat surface. Here the inclination of the vehicle under certain circumstances is extremely low, or even zero, and the hill start aid/assist will not be activated even though there may be a local upward gradient of considerable magnitude (for example 5 or 10%) in the region of the front wheels. When an attempt to start is made, this local upward gradient may cause the vehicle rolling back, this potentially leading to a collision with a vehicle at the rear or even with a pedestrian.

Although there are also systems where the driver can manually switch on the hill start aid/assist as required, this requires additional attention of the driver and the driver either does not notice local upward gradients or finds it difficult to estimate the position of the axles in relation to the local upward gradient since the axles are not in view.

SUMMARY OF THE INVENTION

A system for a vehicle hill start assist including a control system and a sensor. The sensor generating sensor data with the control system using the sensor data to determine existence of a local upward gradient in a driving surface adjacent a vehicle axle. The control system automatically activates the hill start assist independently of whether the motor vehicle is on an upward incline based on the existence of said local upward gradient.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a schematic illustration of a first set of vehicles.

FIG. 2 shows a schematic illustration of a second set of vehicles.

DETAILED DESCRIPTION OF THE PREFERRED EMBODIMENTS

Figure 3:
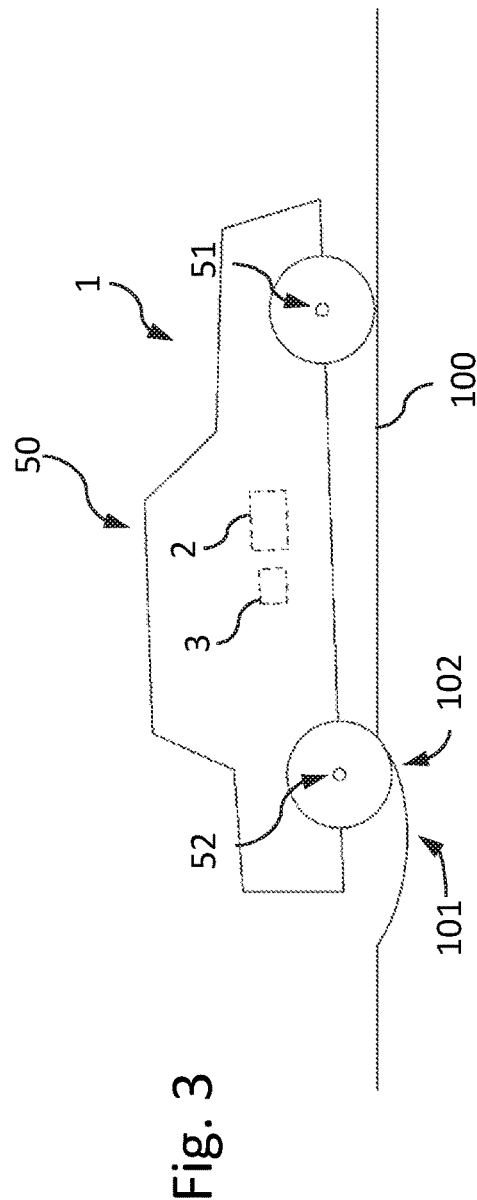
FIG. 3 shows a schematic illustration of a motor vehicle with a first system according to the invention.

The following description of the preferred embodiment(s) is merely exemplary in nature and is in no way intended to limit the invention, its application, or uses. Further advantageous details and effects of the invention are explained in detail in the text, which follows with reference to different exemplary embodiments that are illustrated in the figures, in which identical parts are always provided with the same reference symbol throughout the different figures, and for this reason, said parts are also generally described only once.

FIG. 1 is a schematic illustration of a plurality of vehicles 40, 50, 60 on a driving surface 100. Each vehicle located behind the other at relatively short distances—for example at a red traffic light. A motor vehicle 50, in the middle or between vehicles 40, 60, is situated on a driving surface 100. A front axle 51 located on a flat or horizontal portion of the driving surface 100, while a rear axle 52 is located on a local, upward gradient 102 of a depression 101 in the driving surface 100. The local upward gradient 102 lies in the order of magnitude of 10-15% but leads only to a slight inclination of the vehicle 50.

A conventional hill start assist system, using inclination sensors, would probably not be activated in the shown situation since the upward inclination of the middle vehicle 50 will be assessed as being too low. But the local upward gradient 102 can lead to the middle vehicle 50 rolling back when starting, creating a collision risk with a vehicle 60 behind or to the left of the middle vehicle 50.

FIG. 2 illustrates another vehicle situation, where the front axle 51 of the middle vehicle 50 is located on the local upward gradient 102 of the depression 101 while the rear axle 52 is located on a flat part of the driving surface 100. While this situation may register with the inclination sensors, most likely it would register as a downward inclination of the middle vehicle 50 and would normally not lead to activation of the hill start assist system. While, as shown in FIG. 1, there is a risk of the middle vehicle 50 rolling back and colliding with the vehicle 60 when an attempt to start is made.

FIG. 3 illustrates a first control system 1 according to the invention for a hill start assist used with the vehicle 50. The control system 1 includes a control unit 2 in communication with an inclination sensor 3. For reasons of clarity corresponding bus lines are not illustrated either in this figure or in the further figures. The control unit 2 receives inclination data from the inclination sensor 3 and compares the inclination data with a stored threshold value corresponding to a gradient of zero, typically understood as a flat or horizontal driving surface. When the inclination of the vehicle 50 is at least equal to the threshold value, the control unit 2 activates the hill start assist system. On activation when the driver lets go of the brake pedal the brake is at first not released but is released only when an engine of the vehicle 50 applies enough torque to allow the vehicle to be driven forward or at least to prevent the vehicle from rolling back. By specifying a predetermined threshold value, it is possible to prevent a vehicle from rolling back in situations shown in FIGS. 1 and 2 where there is no upward inclination or only a slight upward inclination of the vehicle 50.

In addition, in a situation where the wheels of the front axle 51 of the vehicle 50 are in a depression 101, shown in FIG. 2, the control system 1, under certain circumstances, functions effectively since an inclination of zero can likewise arise here in the event of heavy loading on the rear axle and corresponding deflection.

The control system 1 evaluates or assesses sensor data from at least one sensor. The sensor can be associated with the motor vehicle. For example, the sensor can be associated only with the control system or, in addition, can also be used by other vehicle systems. The sensor is not limited in principle, but includes, sensors detecting an area surrounding a vehicle and/or the position and orientation of the vehicle relative to the surrounding area.

The control system 1 activates the hill start assist automatically and independently of whether the motor vehicle 50 is on an upward incline depending on the sensor data when there is a local upward gradient 102, 104 in a driving surface 100 in the region of one of the axles 51, 52. The driving surface is normally the surface of a road; however, the system can also be used off-road. The local upward gradient 102, 104 is, in particular, below the axle (rear axle or front axle), so that at least one wheel (normally a pair of wheels) of the corresponding axle is on the local upward gradient. In one example, the local upward gradient 102, 104 is in the region of precisely one axle either the front axle or the rear axle, and is therefore in this region. The upward gradient therefore differs from an upward gradient that extends from the front axle 51 to the rear axle 52 and is reliably established with inclination sensors 3. But with a local upward gradient 102, 104, the upward inclination of the vehicle can be small or the vehicle can be oriented horizontally or even inclined (slightly) downward. The local inclination can, potentially lead to the vehicle rolling backward if the vehicle was started without the hill start assist. A local upward gradient can be created, for example, by the rear end of a dip or depression, the front end of a ridge, a recessed curb, or the like. The control system 1 may activate the hill start assist even where there is a local upward gradient in the region of both axles, for example with two consecutive bumps.

The hill start assist activates automatically without intervention by the driver, depending on the sensor data. The control system 1 evaluates the sensor data and, without intervention by the driver, determines whether to activate the hill start assist. Activation of the hill start assist is irrespective of whether the vehicle is on an upward incline. In some refinements, activation is possible even with a downward inclination. Upward inclination or downward inclination denotes an inclination about the Y-axis of the vehicle, with the front being locally higher than the rear, or the other way around. The control system 1 will also contain the conventional function of a hill start assist, so that the hill start assist is likewise activated in the case of a considerable upward inclination, for example, at an upward gradient of 1% or more. However, the control system 1 also activates the hill start assist according to one example of the present invention in cases in which there is no upward inclination. The hill start assist activates when there is a local upward gradient. In these cases, rolling back owing to a local upward gradient is avoided, specifically without the driver having to do a manual intervention.

As shown, the control system 1 evaluates sensor data from an inclination sensor 3 and activates the hill start assist independently of the presence of the local upward gradient 102, 104 when the inclination of the vehicle is at least equal to a predetermined threshold value. Here inclination denotes the inclination in relation to the horizontal (which extends at a right angle to the direction of gravity), where an upward inclination (corresponding to an upward gradient) is positive and a downward inclination (corresponding to a downward gradient) is negative. In this variant, the control system 1 ascertains the inclination of the vehicle, about the Y-axis of the vehicle, and compares this inclination value with a threshold value corresponding to a horizontal orientation of the vehicle. Therefore, no check is made on whether there is actually a local upward gradient, but rather the hill start assist is activated "on spec." The threshold value might be chosen to be somewhat less than or greater than zero to take into account, for example, the limited measurement accuracy of the inclination sensor.

The control system 1 also evaluates sensor data from at least one sensor to identify a local upward gradient and then to activate the hill start assist. This variant has the advantage that the hill start assist is activated only when it is required. For example, the control system 1 based on the sensor data from at least one sensor determines whether there is a local upward gradient. If so, the hill start assist is activated. The sensor or sensors can be understood to be part of the control system or to be "external." The sensors may be sensors associated with the control system or sensors already present and used by other vehicle systems. Additionally, the control systems may be control systems only able to identify a local upward gradient in the region of one of the axles (for example the front axle) but do not identify a local upward gradient in the region of the other axle (for example the rear axle). However, the control system can preferably identify a local upward gradient both in the region of the front axle and in the region of the rear axle.

Figure 4:
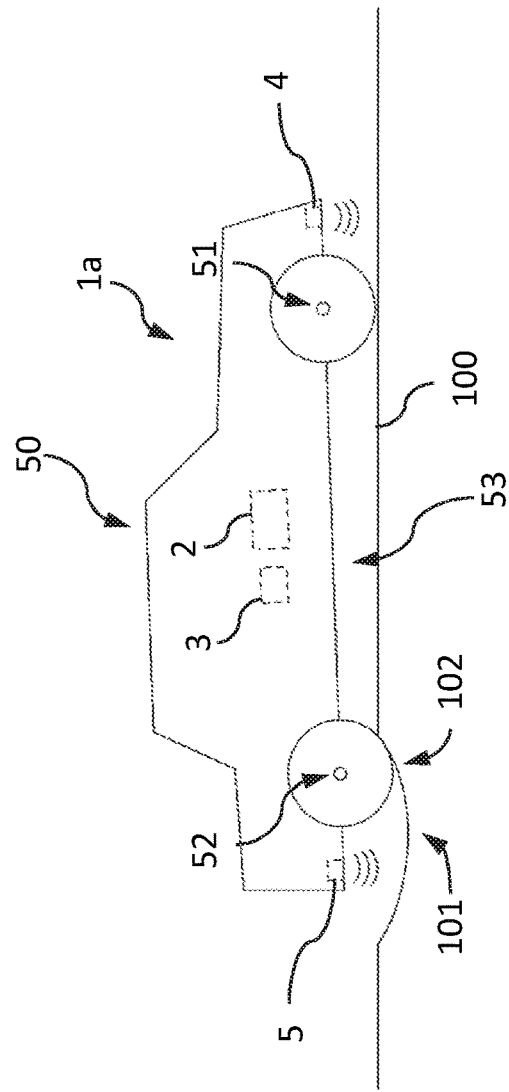
FIG. 4 shows a schematic illustration of a motor vehicle with a second system according to the invention.

FIG. 4 shows the vehicle 50 with a second control system 1a according to the invention. The control unit 2 is again connected to the inclination sensor 3, but, a threshold value which corresponds to an upward gradient of, for example, 3% and is also known in conventional systems is set up. In addition, the control unit 2 is connected to a front ultrasound sensor 4 and to a rear ultrasound sensor 5. Each ultrasound sensor 4, 5 measuring a distance between an underside 53 of the vehicle 50 and the driving surface 100. The ultrasound sensors 4, 5 may be, for example, ultrasound sensors that are also used for automatic headlamp adjustment and are therefore installed in the vehicle 50 independently of the control unit 2. The control unit 2 receives sensor data from the sensors 4, 5 and compares the distances resulting therefrom with stored values that correspond to a flat driving surface.

As shown in FIG. 2, there is a deviation between the distances to the road surface 100 determined by the rear ultrasound sensor 5 and the front ultrasound sensor 4. Based on this difference the control unit 2 identifies a depression 101 and the associated local upward gradient 102 in the region of the rear axle 52. Therefore, the control unit 2 activates the hill start assist although the inclination sensor 3 registers no appreciable upward gradient.

As shown, at least one sensor measures at least one distance between the driving surface and an underside of the motor vehicle. Meaning the at least one sensor measures a distance along the Z-axis of the vehicle. Comparing the measured distance with a distance when the carriageway is flat lets a conclusion be drawn on whether there is a local upward gradient or not.

In one example, sensors 4, 5 measure at least one distance near the front axle and near the rear axle. In this way, making it possible to identify a local upward gradient 102, 104 near each of the two axles 51, 52, and secondly it may be possible to draw further conclusions relating to the vertical profile of the vehicle 50 by combining the sensor 4, 5 data relating to the front and to the rear axle 51, 52. Sensors of this kind can operate, for example, using electromagnetic waves, for example radio waves (radar), or light (lidar) or else using ultrasound. If the sensors are in the form of ultrasound sensors, they can be used, for example, simultaneously by a system for active headlight adjustment. In a vehicle that already has a headlight adjustment system, it may not be necessary to provide more sensors, this making integration of the control system easier.

Figure 5:
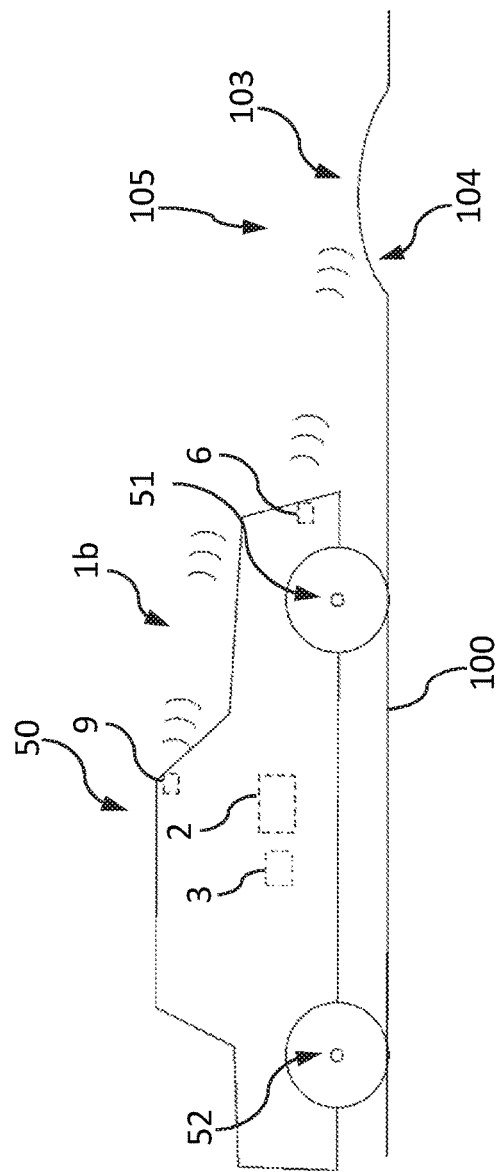
FIG. 5 shows a schematic illustration of a motor vehicle with a third system according to the invention.

FIG. 5 shows the vehicle 50 with a third control system 1*b* according to the invention. Here the control unit 2 is connected to a radar sensor 6 arranged in the front region of the vehicle 50. A lidar sensor 9 installed behind the windshield may also be in a corresponding manner. The radar sensor 6 (or lidar sensor 9) scans a vertical profile 105 of the driving surface 100 in front of the vehicle 50 in the direction of travel. A bump 103 with a local upward gradient 104, for example, is also identified in this way. The control unit 2 stores the time and the position of the local upward gradient 104 and combines this information with speed data of the vehicle 50 to ascertain the location of the local upward gradient 104 in relation to the vehicle and whether the local upward gradient is currently in the region of one of the axles 51, 52. If, when the vehicle 50 is stationary, the control unit 2 establishes that a vertical profile of the driving surface 100, extrapolated in this way, in the region of one of the axles 51, 52 includes a local upward gradient, the control unit activates the hill start assist. In addition, the control unit 2 connects to the inclination sensor 3 and can activate the hill start assist independently of an extrapolated vertical profile when the inclination sensor registers an upward gradient of, for example, over 3%.

The sensor 6, 9 measures a vertical profile of the driving surface in the direction of travel of the motor vehicle 50, and the control system 1*b* combines the sensor data with speed data to extrapolate a vertical profile near at least one of the axles 51, 52 from the combination. In this example, "direction of travel" denotes the direction in which the vehicle is moving for example behind the vehicle when the vehicle is reversing and in front of the vehicle when the vehicle is moving forward. Embodiments in which a measurement of the vertical profile is possible only in front of the vehicle, but not behind the vehicle, are also included here. A local upward gradient, which is located in the direction of travel of the vehicle, can be identified by measuring the vertical profile. Combination with the speed data makes it possible to ascertain when (or whether) the local upward gradient is located in the region of the front axle or of the rear axle. Even if the at least one sensor cannot directly detect the region beneath the vehicle, the vertical profile there can be ascertained by the outlined extrapolation.

The control system 1*b* in this example must have a memory or has to be connected to a memory where sensor data about the vertical profile in the direction of travel is stored, it being possible to access said memory when the vehicle is above the proper region. Again, the sensor may be a radar sensor or lidar sensor. It is possible to use, for example, sensors which, in certain vehicles, are used for adaptive or active chassis control to identify uneven areas in front of the vehicle and to alter the suspension in respect of said uneven areas in a targeted manner, or to use sensors of an extension of the emergency brake assistant (typically lidar) or of the adaptive cruise control system (typically radar). If a vehicle model has sensors of this kind, there is therefore no need to install any additional sensors for integration of the control system according to the invention. The measurement of the vertical profile in the direction of travel can be combined with the measurement of the distance between the vehicle underside and the driving surface outlined above. The embodiment outlined below can also be combined with one or both variants.

Figure 6:
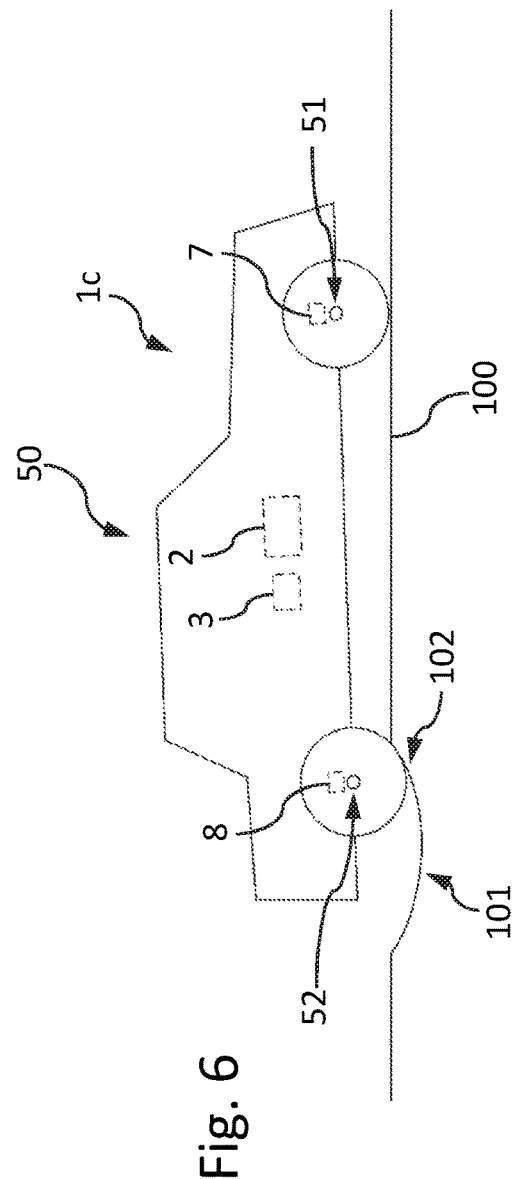
FIG. 6 shows a schematic illustration of a motor vehicle with a fourth system according to the invention.

FIG. 6 shows the vehicle 50 having a fourth control system 1*c* according to the invention. Again, the control unit 2 connects to the inclination sensor 3 and, in the case of an upward gradient of greater than 3%, can activate the hill start assist independently of other sensor data. In addition, pressure sensors 7, 8 measure the pressures of the wheel brake cylinders for the front axle 51 and the rear axle 52 to ascertain respective braking torques at the axles 51, 52. The control unit 2 compares the braking torques with stored values ascertained in experiments relating to braking processes at different local upward gradients. The stored values can correspond to pressures in the wheel brake cylinder or else to braking torques or braking forces, which may be converted into one another in a simple manner. Since the braking torques normally speed-dependent, the stored values are also associated with speeds. The control unit 2 combines the registered braking torques during a braking process with current speed data and looks for agreement with stored values for the corresponding speed.

In addition, the axle load on the respective axle 51, 52 can also be ascertained with sensors, not illustrated here, and considered when looking at the braking torques. The corresponding axle load can be ascertained in advance when the vehicle is stationary or else during driving. When there is agreement with stored values, it is concluded there is a local upward gradient. When one of the axles 51, 52 is positioned on a local upward gradient 102 at the end of a braking process, the control unit 2 activates the hill start assist for the subsequent starting process.

The sensors 7, 8 at least indirectly measure braking torques of the rear axle 52 and of the front axle 51, and the control system 1*c* compares the sensor data with stored comparison values. Indirect measurement denotes the measurement of at least one variable from which the braking torque can be ascertained (and possibly the other way around). Explicit conversion into braking torques is unnecessary and the comparison values do not necessarily have to explicitly indicate braking torques. When the vehicle is braked, different braking torques are required at the respective axles depending on whether the driving surface is flat or there is a local upward gradient. Therefore, there may be a tendency to assume that when there is a flat driving surface, for example, at the rear axle while there is a local upward gradient at the front axle, the braking torque at the front axle is slightly reduced, while the braking torque at the rear axle may be somewhat increased. The precise relationships are complicated to detect, and therefore it is expedient to use comparison values ascertained under controlled experimental conditions and to compare the comparison values with the values measured in each case. Since the braking torques also depend on the axle load, it may be expedient to measure the load on the front axle and on the rear axle by corresponding sensors. This can be done, for example, before the start of the journey or at a time at which the vehicle has stopped and ideally on a flat substrate without an inclination.

Since only the time period and physical region immediately before the vehicle comes to a standstill are relevant, it would suffice, in principle, to carry out the corresponding comparisons only for the last section of a braking process, for example, below a speed of 5 km/h or the like, where the last registered values would be crucial. Said values represent the presence of a local upward gradient at the end of the braking process. The braking torques generally lead to the conclusion there is a local upward gradient not only qualitatively, but a quantitative estimation of the local upward gradient may also be possible. So the comparison values can hold information about local upward gradients of different magnitudes. Where the vehicle covers more than the distance between the front axle and the rear axle during the braking process, the values ascertained in relation to the front axle can also be used to verify the values determined in relation to the rear axle at a later time. Here it is necessary to combine the sensor data with speed data to ascertain when a specific region of the driving surface, which the front axle has passed, is beneath the rear axle. Given a known arrangement and design of the brake, measurement of the braking force permits drawing a conclusion about the braking torque drawn and the other way around, and measurement of the braking force corresponds to indirect measurement of the braking torque. The braking torque is typically ascertained with a pressure measurement in the main brake cylinder or in the wheel brake cylinder. So a pressure value (in bar) corresponds, after conversion, to a specific braking torque (Nm), and the pressure measurement corresponds to indirect measurement of the braking torque. This measurement can be done at the wheel brake cylinders, because of which wheel-specific measurement is possible.

Braking torques depend typically on the speed of the vehicle, making this into consideration, the comparison values can be speed-dependent and the control system can combine the sensor data with speed data. The control system therefore ascertains the speed of the vehicle and uses only those comparison values that correspond to speed.

The present example shows a control system 1 for a hill start assist of a motor vehicle 50. The motor vehicle includes a front axle 51 and a rear axle 52 and can be a passenger car or a truck. It is possible for there to be yet further axles, for example the motor vehicle may include a plurality of rear axles or even a plurality of front axles. The term "hill start assist" is equivalent to "hill start aid" and indicates a system that, during starting, at first applies or sets a brake and releases the brake again only when the engine of the motor vehicle provides enough torque for forward movement. With the present invention, this term should not be understood as meaning that the system responds only on a hill or at an upward gradient.

The combinations, shown in FIGS. 4-6, of sensors 4, 5, 6, 7, 8, 9 with the control unit 2 can be combined with one another wherein the reliability of the control system can be further increased by the results, obtained with different sensors 4, 5, 6, 7, 8, 9 being compared with one another.

The control system can be implemented partially by software and the hardware resources of the control system (for example processors, memories, bus systems or the like) may also be used by other systems of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for a motor vehicle, which comprises a front axle and rear axle, the system comprising:
   a front sensor located between a front of the vehicle and the front axle, the front sensor measuring a distance between an underside of the motor vehicle and a driving surface;
   a rear sensor located between a rear of the vehicle and the rear axle, the rear sensor measuring the distance between the underside of the motor vehicle and the driving surface;
   an inclination sensor measuring an inclination of a longitudinal axis of the motor vehicle extending between the front axle and rear axle;
   a control system connected to and receiving input from said front sensor, said rear sensor, and said inclination sensor;
   said control system configured, based on said inclination measurement, automatically activate a hill start assist system when said inclination measurement exceeds a threshold inclination measurement value; and
   said control system configured to determine, based on said front and rear sensor measurements, existence of a local upward gradient in the driving surface in a region of one of the front axle and the rear axles wherein said control system automatically activates a hill start assist based on the existence of the local upward gradient when an inclination value of the inclination of the longitudinal axis of the vehicle is below the threshold inclination value.

2. The system of claim 1 wherein said control system activates the hill start assist independent of the existence of the local upward gradient when the inclination of the vehicle is at least equal to a predetermined inclination threshold value.

3. The system of claim 1 wherein said front sensor measures a distance between the driving surface and the underside of the motor vehicle in a region of the front axle and said rear sensor measures a distance between the driving surface and the underside of the motor vehicle in a region of the rear axle.

4. The system of claim 1 wherein at least one of the front sensor and the rear sensor is an ultrasound sensor.

5. A vehicle comprising:
   a control system;
   a front sensor, the front sensor measuring a distance to a driving surface in a region of a front axle;
   a rear sensor, the rear sensor measuring a distance to a driving surface in a region of a rear axle;
   an inclination sensor measuring an inclination of a longitudinal axis of the motor vehicle extending between the front axle and rear axle;
   the control system connected to and receiving input from said front sensor, said rear sensor, and said inclination sensor;
   the control system configured to, based on said inclination measurement, automatically activate a hill start assist system when said inclination measurement exceeds a threshold inclination measurement value; and the control system configured to determine, based on the distance measured by the front sensor and the distance measured by the rear sensor existence of a local upward gradient in a driving surface adjacent to one of the front and rear axles, wherein said control system automatically activates the hill start assist based on the existence of the local upward gradient of the driving surface independent of an inclination of a longitudinal axis of the vehicle extending between the front axle and the rear axle.

6. The system of claim 5 wherein said control system activates the hill start assist independently of the existence of the local upward gradient when an inclination of the vehicle is at least equal to a predetermined inclination threshold value.

7. The system of claim 5 wherein at least one of the front sensor and the rear sensor is an ultrasound sensor.

\* \* \* \* \*